(12) United States Patent
Sato et al.

(10) Patent No.: US 10,303,406 B2
(45) Date of Patent: May 28, 2019

(54) INFORMATION PROCESSING UTILIZATION MANAGEMENT SYSTEM CAPABLE OF DETERMINING WHETHER OR NOT INFORMATION PROCESSING DEVICE IS AVAILABLE FROM APPLICATION IN MOBILE TERMINAL, INFORMATION PROCESSING DEVICE, AND METHOD OF MANAGING INFORMATION PROCESSING UTILIZATION

(71) Applicant: KYOCERA Document Solutions Inc., Osaka (JP)

(72) Inventors: Makiko Sato, Osaka (JP); Toshitsugu Nishimi, Osaka (JP); Yasushi Tsukamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 3 days.

(21) Appl. No.: 15/445,483

(22) Filed: Feb. 28, 2017

(65) Prior Publication Data
US 2017/0249113 A1  Aug. 31, 2017

(30) Foreign Application Priority Data
Feb. 29, 2016 (JP) .................................. 2016-037240

(51) Int. Cl.
*G06F 3/12* (2006.01)
*H04N 1/44* (2006.01)

(52) U.S. Cl.
CPC .......... *G06F 3/1226* (2013.01); *G06F 3/1222* (2013.01); *G06F 3/1238* (2013.01); *G06F 3/1239* (2013.01); *G06F 3/1292* (2013.01); *H04N 1/4406* (2013.01); *H04N 1/4433* (2013.01)

(58) Field of Classification Search
CPC ............. H04N 1/00896; H04N 1/4433; H04N 1/4406; H04N 1/44; H04N 1/4413;
(Continued)

(56) References Cited

U.S. PATENT DOCUMENTS 5,580,177 A * 12/1996 Gase ..................... G06F 3/1204
358/1.15
2004/0230318 A1* 11/2004 Shimizu .................. G06F 21/56
700/1
(Continued)

FOREIGN PATENT DOCUMENTS

JP        2009-157531 A      7/2009

*Primary Examiner* — Chad Dickerson
(74) *Attorney, Agent, or Firm* — Hawaii Patent Services; Nathaniel K. Fedde; Kenton N. Fedde

(57) ABSTRACT

Provided is an information processing utilization management system (IPUMS) that can determine whether an information processing device (IPD) is available from an application of a mobile terminal (MT). The IMPUMS includes the MT and IPD connected thereto via a network, the IPD accepting a process request (PR) from the MT-installed application to execute a process. The MT includes a process data (PD) generation part generating PD based on the PR from the application to transmit the PD to the IPD. The IPD includes a PD receiving part receiving the PD, a MT kind-code obtaining part obtaining a kind-code of the MT from the PD, an application information (AI) obtaining part obtaining II of the application from the PD, and a utilization restriction determination part determining whether the PR from the AI is acceptable based on the kind-code of the MT and the II of the application.

7 Claims, 9 Drawing Sheets

| KIND-CODE OF MOBILE TERMINAL | APPLICATION IDENTIFICATION INFORMATION | UTILIZATION RESTRICTION (EXISTENCE/NON-EXISTENCE) | RESTRICTED FUNCTION UPON EXISTENCE OF RESTRICTION |
|---|---|---|---|
| A1 | B1 | EXISTENCE | COLOR PRINT |
| | B2 | NON-EXISTENCE | — |
| | B3 | NON-EXISTENCE | — |
| | B4 | EXISTENCE | ALL FUNCTIONS |
| | ⋮ | ⋮ | ⋮ |
| A2 | B1 | NON-EXISTENCE | — |
| | B2 | NON-EXISTENCE | — |
| | B3 | EXISTENCE | PAGE AGGREGATION PRINT |
| | B4 | EXISTENCE | DOUBLE-SIDED PRINT |
| | ⋮ | ⋮ | ⋮ |
| ⋮ | ⋮ | ⋮ | ⋮ |

(58) Field of Classification Search
CPC ........... H04N 1/00838; H04N 1/00949; H04N 1/00925; H04N 1/00941; H04N 1/00503; H04N 1/32128; G06F 3/1237; G06F 3/1238; G06F 21/608; G06F 3/1239; G06K 15/406; G06K 15/4095
USPC ........ 358/1.11–1.18, 1.1, 400–404; 726/1–5, 726/17–21, 26–33; 713/155
See application file for complete search history.

(56) References Cited

U.S. PATENT DOCUMENTS

| | | | | |
|---|---|---|---|---|
| 2005/0055547 | A1* | 3/2005 | Kawamura | G06F 21/31 713/155 |
| 2007/0046967 | A1* | 3/2007 | Bounar | G06F 3/1222 358/1.13 |
| 2007/0253014 | A1* | 11/2007 | Nakata | G06F 3/1219 358/1.14 |
| 2009/0122347 | A1* | 5/2009 | Utsubo | G06F 21/608 358/1.16 |
| 2009/0225349 | A1* | 9/2009 | Hirai | H04N 1/00204 358/1.15 |
| 2010/0290076 | A1* | 11/2010 | Itoh | G06F 21/34 358/1.14 |
| 2010/0296123 | A1* | 11/2010 | Maruyama | G06F 3/121 358/1.15 |
| 2014/0118765 | A1* | 5/2014 | Yang | G03G 15/5004 358/1.13 |
| 2014/0293325 | A1* | 10/2014 | Haapanen | G06F 3/1268 358/1.15 |
| 2015/0092231 | A1* | 4/2015 | Shibata | H04W 76/36 358/1.15 |

* cited by examiner

| FIG. 2A | FIG. 2B |
|---------|---------|
| FIG. 2C | FIG. 2D |

FIG. 3

| KIND-CODE OF MOBILE TERMINAL | APPLICATION IDENTIFICATION INFORMATION | UTILIZATION RESTRICTION (EXISTENCE/NON-EXISTENCE) | RESTRICTED FUNCTION UPON EXISTENCE OF RESTRICTION |
|---|---|---|---|
| A1 | B1 | EXISTENCE | COLOR PRINT |
| | B2 | NON-EXISTENCE | — |
| | B3 | NON-EXISTENCE | — |
| | B4 | EXISTENCE | ALL FUNCTIONS |
| | ⋮ | ⋮ | ⋮ |
| A2 | B1 | NON-EXISTENCE | — |
| | B2 | NON-EXISTENCE | — |
| | B3 | EXISTENCE | PAGE AGGREGATION PRINT |
| | B4 | EXISTENCE | DOUBLE-SIDED PRINT |
| | ⋮ | ⋮ | ⋮ |
| ⋮ | ⋮ | ⋮ | ⋮ |

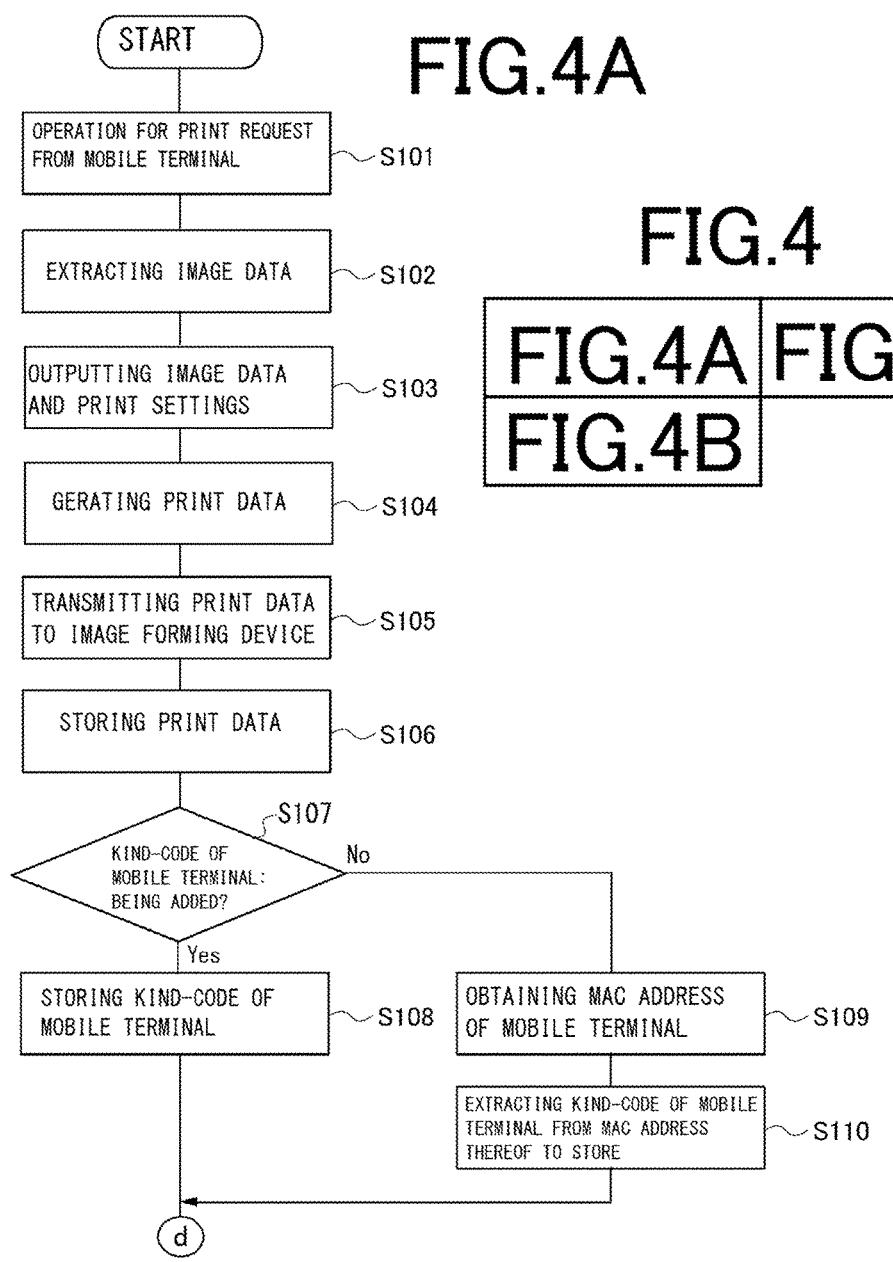

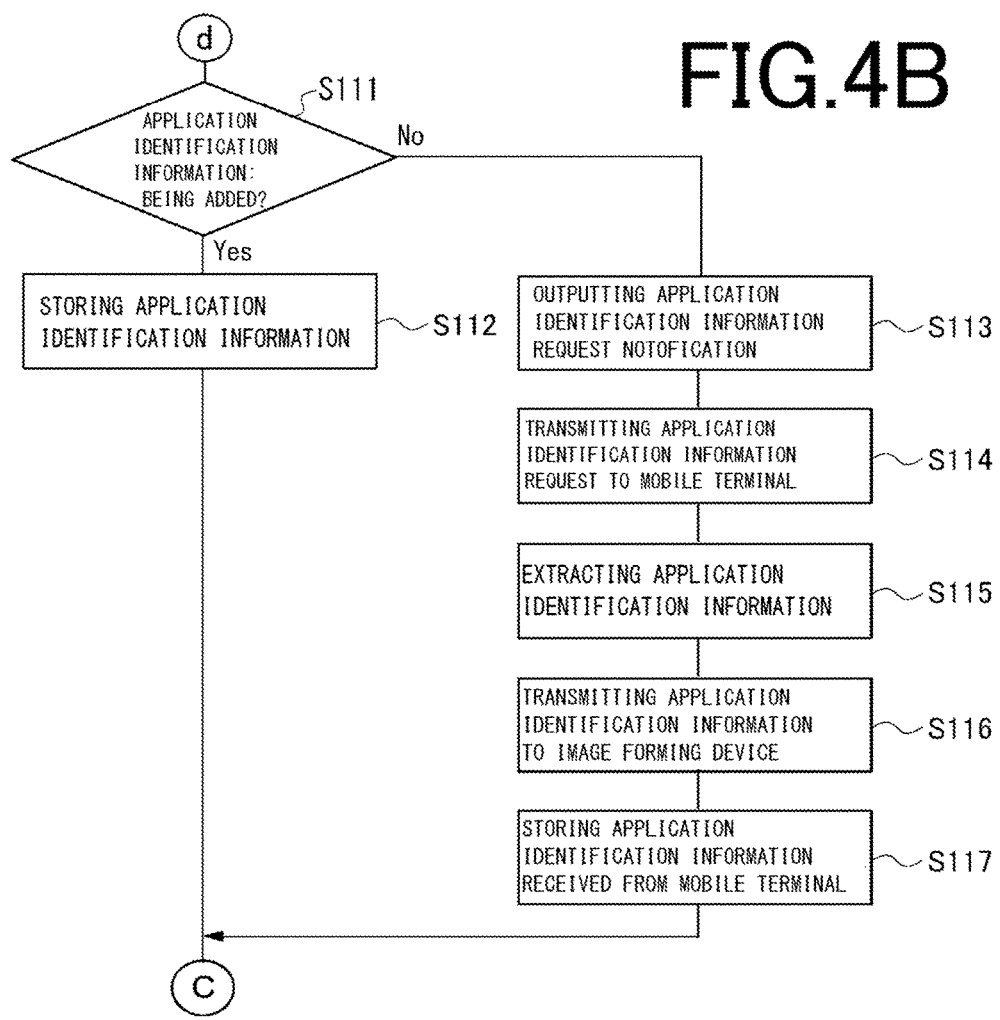

INFORMATION PROCESSING UTILIZATION MANAGEMENT SYSTEM CAPABLE OF DETERMINING WHETHER OR NOT INFORMATION PROCESSING DEVICE IS AVAILABLE FROM APPLICATION IN MOBILE TERMINAL, INFORMATION PROCESSING DEVICE, AND METHOD OF MANAGING INFORMATION PROCESSING UTILIZATION

INCORPORATION BY REFERENCE

This application is based on and claims the benefit of priority from Japanese Patent Application No. 2016-037240 Filed on Feb. 29, 2016, the contents of which are hereby incorporated by reference.

BACKGROUND

The technical field of the present disclosure relates to an information processing utilization management system, an information processing device, and a method of managing information processing utilization, all of which determine whether or not the information processing device can be utilized from a mobile terminal.

A request for the printing of print data is available from a mobile terminal such as a cell phone, a smart phone, a tablet terminal or the like, by wireless communication, to an image forming device such as a printer, a multi-function printer, a multi-function periphery, a combined machine or the like. For this reason, the image forming device determines whether or not a print request from the mobile terminal is made by the legitimate user for not accepting a print request from an authorized user. For example, in typical print management server and print management system, the print management server, in which a user name, an IP address of the mobile terminal, and a print history are recorded as print management information, determines whether or not a print request from a mobile terminal is allowable using the user name and the IP address of the mobile terminal received from the mobile terminal, thereby causing the print device to print the print data if the determination is allowable. In such a way, as to how to cope with the print request from the mobile terminal, the print management server determines whether or not the print request from the mobile terminal is allowable using the user name and the IP address of the mobile terminal, which allows the legitimate user and terminal mobile to causes the print device to print the print data.

SUMMARY

An information processing utilization management system according to the present disclosure includes a mobile terminal and an information processing terminal that is connected, via a network, to the mobile device, the information processing device accepting a process request from an application installed in the mobile terminal to execute a process. The mobile terminal includes a process data generation part generating process data based on the process request from the application and transmits the process data to the information processing device. The information processing device includes a process data receiving part receiving the process data, a mobile terminal kind-code obtaining part that obtains a kind-code of the mobile terminal from the process data, an application information obtaining part obtaining identification information of the application from the process data, and a utilization restriction determination part determining whether or not the process request from the application is acceptable based on both the kind-code of the mobile terminal and the identification information of the application.

An information processing device according to the present disclosure is connected, via a network, to a mobile terminal and accepts a process request from an application that is installed in the mobile terminal to execute a process. The information processing device includes a process data receiving part that receives the process data that is generated based on the process request from the application, a mobile terminal kind-code obtaining part that obtains a kind-code of the mobile terminal from the process data, an application identification information obtaining part that obtains identification information of the application from the process data, and a utilization restriction determination part that determines whether or not the process request from the application is acceptable based on both the kind-code of the mobile terminal and the identification information of the application.

A method of managing an information processing utilization according to the present disclosure includes the steps of: causing a mobile terminal to generate process data based on a process request from an application that is installed in the mobile terminal; transmitting the process data to an information processing device that is connected to the mobile terminal via a network and that accepts the process request from the application installed in the mobile terminal to execute a process. This method then causes the information processing device to receive the process data, to obtain a kind-code of the mobile terminal from the process data, to obtain identification information of the application from the process data, and to determine whether or not the process request from the application is acceptable based on both the kind-code of the mobile terminal and the identification information of the application.

BRIEF DESCRIPTION OF THE DRAWINGS

FIG. 3 is a tabular figure of a configuration of a print function utilization restriction table according to the embodiment of the present disclosure.

DETAILED DESCRIPTION

Hereinbelow, with reference to the attached drawings, a description is made as to an embodiment for carrying out the present disclosure (hereinafter, which is referred to as "embodiment").

In an information processing utilization management system 10, an application of a mobile terminal 100 transmits print data to an image forming device 200 using a printer driver that supports multi-type machines.

In addition, the image forming device 200 determines, based on a kind-code such as an equipment code of the mobile terminal 100 from which the print data is transmitted (hereinafter, which is referred to as "kind-code of the mobile terminal") and information that is capable of identifying the application (hereinafter, which is referred to as "identification information of the application"), whether or not the mobile terminal is to be under a restriction in function utilization and processes the print data if no utilization restriction is found.

Figure 1:
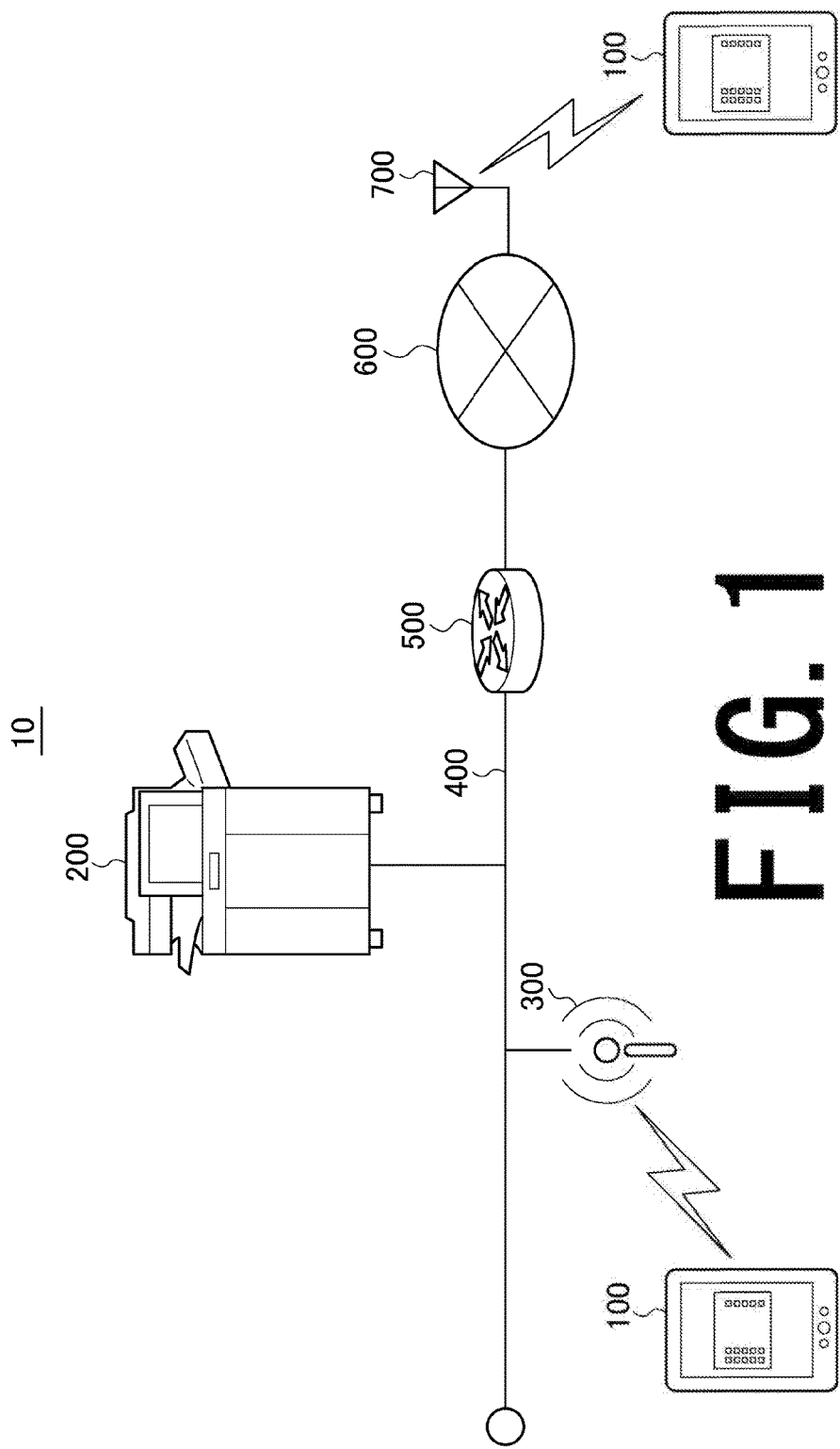
FIG. 1 is an illustration of a configuration of an information processing utilization system according to an embodiment of the present disclosure.

First of all, with reference to FIG. 1, a description is made as to a system configuration of the information processing utilization management system 10 according to the present embodiment. As illustrated in FIG. 1, the information processing utilization management system 10 includes the mobile terminal 100, the image forming device 200, an access point 300, a network 400, a router 500, the Internet 600 and an access point 700. The image forming device 200 and the access point 300 are connected to the network 400 and the network 400 is connected, via the router 500, to the Internet 600.

The mobile terminal 100 is in the form of a cell phone or a tablet terminal. The mobile terminal 100 is capable of transmitting and receiving data to and from the image forming device 200 by being connected to the network 400 via the access point 300 or by being connected to the internet 600 via the access point 700.

The image forming device 200, which is in the form of a printer, a multi-function printer, a multi-function peripheral, or a combined machine, is capable of transmitting and receiving data to and from the mobile terminal 100 by being connected to the network 400 or the Internet 600.

The access point 300, which is connected to the network 400, causes the mobile terminal 100 that makes a request, by radio communication, for being connected to the access point 300 to connect to the network 400.

The network 400, which is in the form a LAN or other type network (such as for example an intra net), is connected with the image forming device 200 and the access point 300.

The router 500, which is connected to the network 400, connects the network 400 to the Internet 600.

The internet 600, which is in the form of an IP network such as the Internet, an intranet, or the like, is connected with the access point 700.

The access point 700, which is connected to the Internet 600, causes the mobile terminal 100 that makes a request, by radio communication, for being connected to the access point 700 to connect to the Internet 600.

Figure 2:
FIG. 2 is an illustration of functional configurations of a mobile terminal and an image forming device in the information processing utilization system that is illustrated in FIG. 1.
Figure 2A:
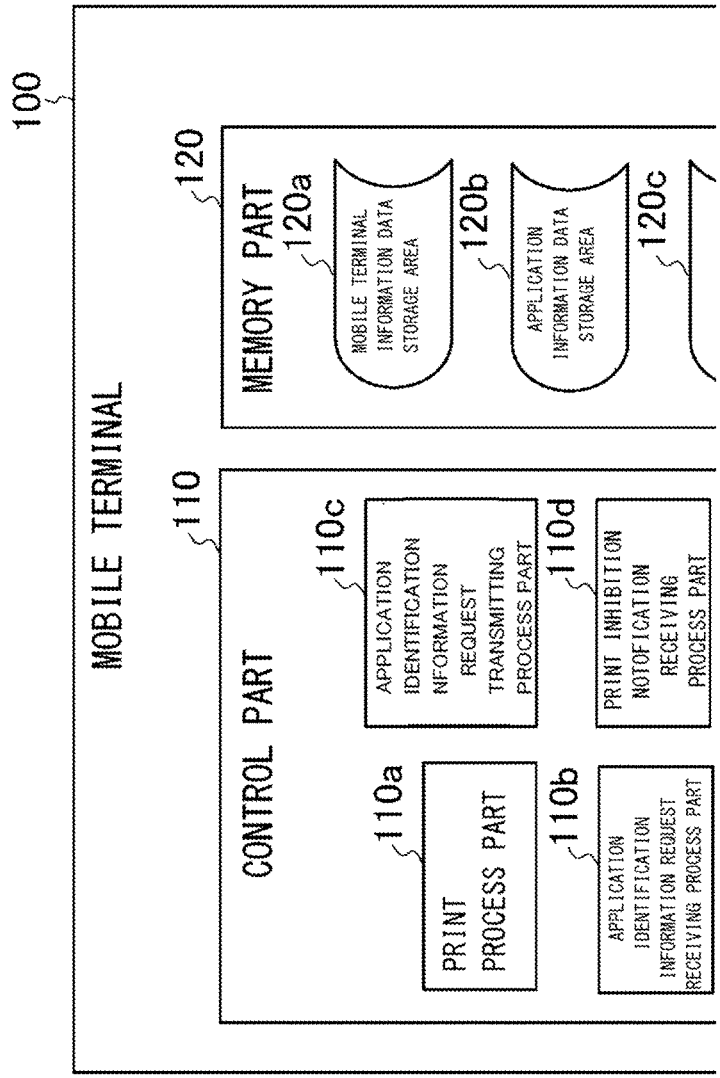
Figure 2B:
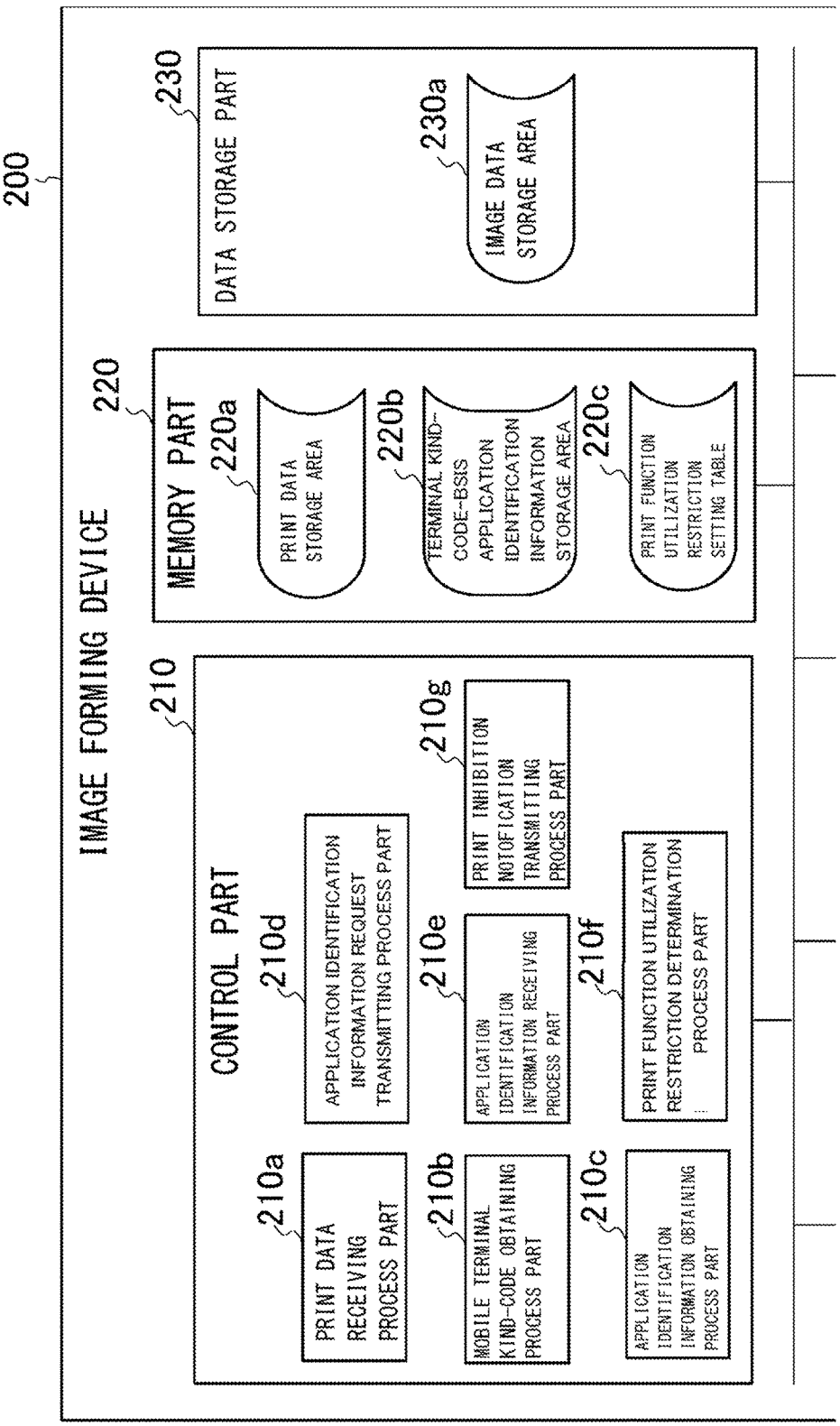
Figure 2C:
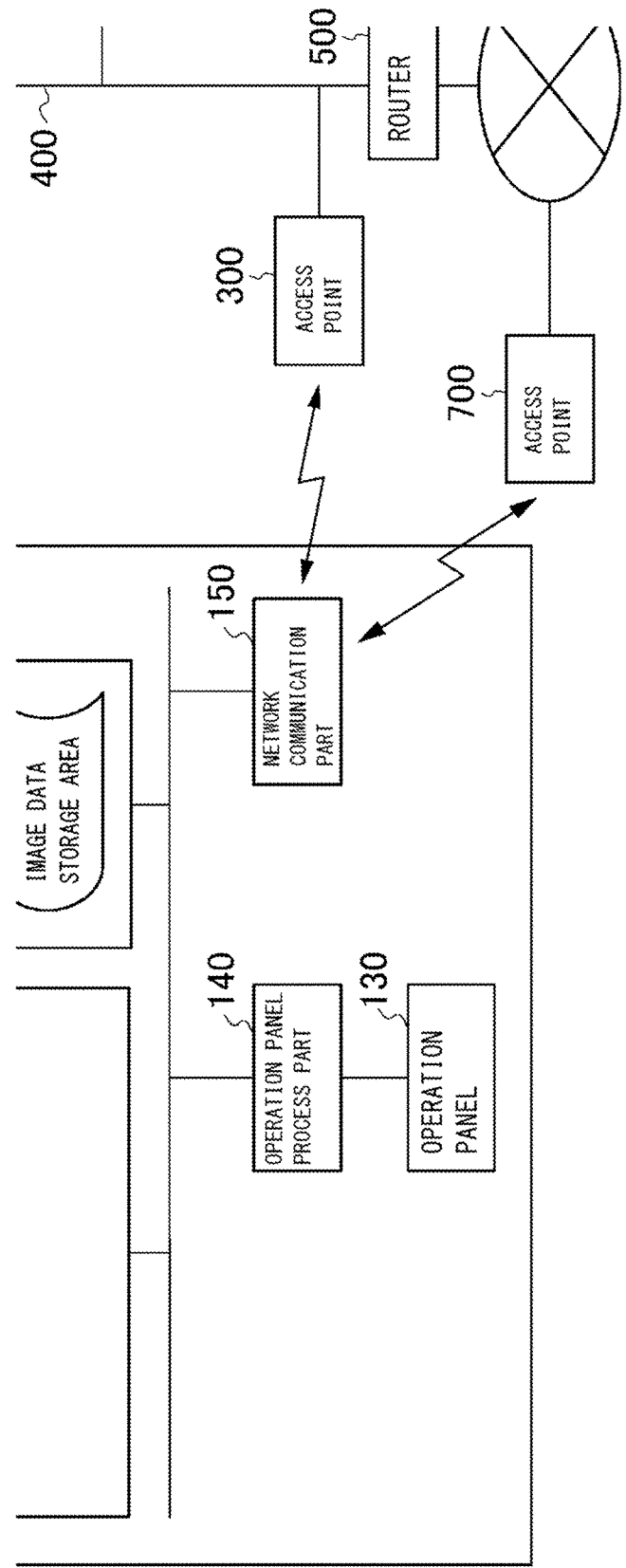
Figure 2D:
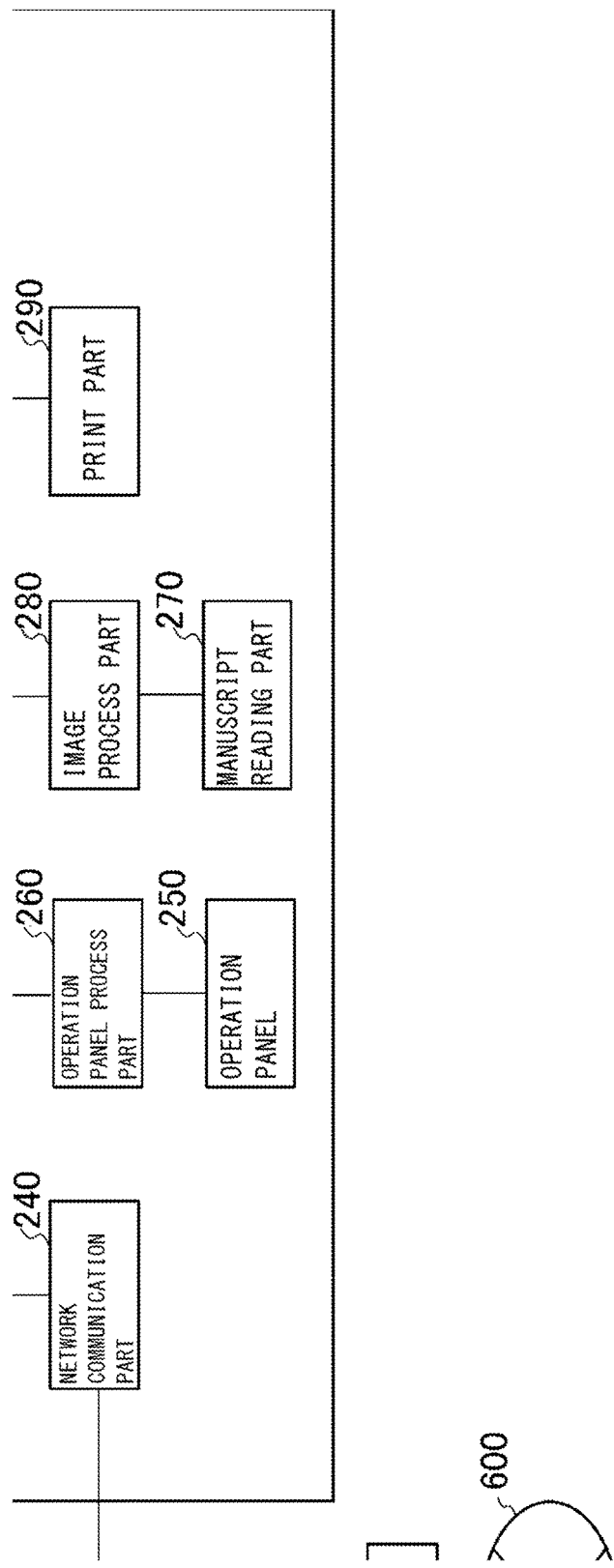

Next, with reference to FIG. 2, a description is made as to functional configurations of the mobile terminal 100 and the image forming device 200, respectively, in the information processing utilization management system 10.

At first, the functional configuration of the mobile terminal 100 is described. The mobile terminal 100 that is illustrated in FIG. 2 includes a control part 110, a memory part 120, an operation panel 130, an operation panel process part 140 and a network communication part 150. Such a configuration is established by interconnecting these parts via a bus or the like. The control part 110 is provided with a print process part 110a, an application identification information request receiving part 110b, an application identification information request transmitting process part 110c, and a print inhibition notice receiving process part 110d. The memory part 120 is provided with a mobile terminal information data storage area 120a, an application information data storage area 120b, and an image data storage area 120c.

The control part 110 is provided with a main storage device such as for example a RAM or ROM, and a control device such as for example a CPU. In addition, the control part 110 makes a total control on the mobile terminal 100, the total control including, for example, controlling various I/Os, interfaces such as a USB and the like, and a bus controller.

The print process part 110a, which is a printer driver that supports multiple types devices, generates print data based on a print request from the application and transmits the generated print data to the image forming device 200.

The application identification information request receiving part 110b receives, from the image forming device 200, data that requests for identification information of the application (hereinafter, which is referred to as "application identification information request data").

The application identification information request transmitting process part 110c extracts the application identification information from the application information data storage area 120b to transmit the extracted application identification information to the image forming device 200.

The application identification information request receiving process part 110d receives the print inhibition notice data that is to be transmitted in a case where the image forming device 200 will not print the print data from the mobile terminal 100.

The memory part 120, which is in the form of an auxiliary storage device such as for example a flash memory, stores programs and data that are for the process executed by the control part 210.

The mobile terminal information data storage area 120a stores information that is related to the mobile terminal 100, examples of this information including, for example, the kind-code of the mobile terminal 100, the OS version of OS, and the memory capacity.

The application information data storage area 120b stores information that is related to the application, examples of this information including, for example, the application identification information that is installed in the mobile terminal 100, the installed data, the providing source, and the operation environment.

The image data storage area 120c stores image data that is scanned by a scanner, image data that is created by a document creation software, or image data that is received from another mobile terminal 100. It is to be noted that the plural pieces of image data stored in the image data storage area 120c are provided with respective names for identification.

The operation panel 130, which is a liquid crystal panel, displays operation items for operating the mobile terminal 100 and various pieces of information, displays a message that is issued from the mobile terminal 100 and accepts an operation that is conducted by a user.

The operation panel process part 140 performs operations that include displaying operation items corresponding to the functions of the mobile terminals 100, displaying various pieces of information and image data that are stored in the mobile terminal 100, or inputting the user conducted operation from the operation panel 130.

The network communication part 150 causes the mobile terminal 100 to connect to the image process device 200 that is connected with the network 400 for transmitting and receiving data to and from, respectively, by connecting the mobile terminal 100 to the network 400 from the access point 300 or from the access point 700 via the Internet 600 and the router 500.

Next, a description is made as to functional configuration of the image forming device 200. The image forming device 200 that is illustrated in FIG. 2 includes a control part 210, a memory part 220, a data storage part 230, a network communication part 240, an operation panel 250, an operation panel process part 260, a manuscript reading part 270, an image process part 280, and a print part 290. Such a configuration is established by interconnecting these parts via a bus or the like. The control part 210 is provided with a print data receiving process part 210a, a mobile terminal kind-code obtaining process part 210b, an application identification information obtaining process part 210c, an application identification information request transmitting process part 210d, an application identification information receiving process part 210e, an print function utilization restriction determination process part 210f, and a print inhibition notice transmitting process part 210g. The memory part 220 is provided with a print data storage area 220a, a terminal kind-code-basis application identification information storage area 220b, and print function restriction setting table 220c. The data storage part 230 is provided with an image data storage area 230a.

The control part 210 is provided with a main storage device such as for example a RAM or ROM, and a control device such as for example a CPU. In addition, the control part 210 makes an overall control on the image forming device 200, examples of the control including controlling various I/Os, interfaces such as a USB and the like, and a bus controller.

The print data receiving process part 210a receives print data from the mobile terminal 100.

The mobile terminal kind-code obtaining process part 210b obtains a kind-code of the mobile terminal 100 that is the transmission source of the print data.

The application identification information obtaining process part 210c obtains identification information of the mobile terminal 100 that is the transmission source of the print data.

The application identification request transmitting process part 210d transmits the identification information of the application to the mobile terminal 100.

The application identification information receiving process part 210e receives the identification information of the application from the mobile terminal 100.

The print function utilization restriction determination process part 210f determines whether or not a print function that is related to the application of the mobile terminal 100 is restricted in utilization based on the kind-code of the mobile terminal 100 and the identification information of the application.

The print inhibition notice transmitting process part 210g transmits, if the application of the mobile terminal 100 is determined not to utilize the print function by the print function utilization restriction determination process part 210f, transmits a notice of print inhibition to the mobile terminal 100.

The memory part 220, which is in the form an auxiliary storage device such as for example a flash memory, stores programs and data that are for the process that the control part 210 executes.

The print data storage area 220a stores the print data that is received from the mobile terminal 100.

The terminal kind-code-basis application identification information storage area 220b stores the kind-code of the mobile terminal 100 that the mobile terminal kind-code obtaining process part 210b obtains and the application identification information that the application identification information obtaining process part 210c obtains.

The print function utilization restriction setting table 220c sets existence or non-existence of the print function utilization restriction that corresponds to the kind-code of the mobile terminal 100 and the application identification, and the function to be restricted if the utilization restriction exists. It is to be noted that the structure of the print function utilization restriction setting table 220c is detailed later.

The data storage part 230 is in the form of a hard disk drive that stores data and programs. The image data storage area 230a stores image data that is converted by the image process part 280 after being read from the manuscript reading part 270 and image data that is received from another device via the network communication part 240. It is to be noted that the plural pieces of image data stored in the image data storage area 230a are provided with respective names for identification.

The network communication part 240 causes the image forming device 200 to connect to the network 400, which makes it possible for the image forming device 200 to transmit and receive data to and from, respectively, the mobile terminal 100 that is connected to the network 400. In addition, the network communication part 240 is capable of obtaining a MAC address of the mobile terminal 100 using the private MIB command of the network monitoring SNMP.

The operation panel 250 is a liquid crystal panel that displays operation items for operating the image forming device 200 and various pieces of information, and accepts an operation that is conducted by the user.

The operation panel process part 260 performs operations that include displaying operation items corresponding to the functions of the image forming device 200, displaying various pieces of information and image data that are stored in the image forming device 200, or inputting the user conducted operation from the operation panel 250.

The manuscript reading part 270 reads a document mounted on a platen of the image forming device 200 pursuant to a reading operation conducted on the operation panel 250 by a user and outputs the read manuscript data to the image process part 280.

The image process part 280 converts, immediately when the manuscript data that the manuscript reading part 270 has read is inputted, the manuscript data into image data that is capable of being processed by the image forming device 200.

The print part 290 prints the image data based on print settings that include setting size of print paper, double-sided print, page aggregation print, and monochrome or color printing.

Next, as to a configuration of the print function utilization restriction setting table 220c, a description is made with reference to FIG. 3.

As illustrated in FIG. 3, the print function utilization restriction setting table 220c is provided with items for "kind-code of mobile terminal", "application identification information", "utilization restriction: existence or non-existence", and "restricted function upon existence of restriction".

The item: "kind-code of mobile terminal" is for setting the kind-code of mobile terminal 100.

The item: "application identification information" is for setting the identification information of the application in the mobile terminal 100.

The item: "utilization restriction: existence or non-existence" is for setting whether or not the print function restriction exists that corresponds to the kind-code of the mobile terminal 100 and the application identification information.

The item: "restricted function upon existence of restriction" is for setting a print function to be restricted when the item "utilization restriction: existence or non-existence" is indicative of "existence".

For example, in a case where the item:" kind-code of the mobile terminal" is indicative of "A1" and the item: "application identification information" is indicative of "B4", the item: "utilization restriction: existence or non-existence" is indicative of "existence" that corresponds to the contents of the preceding items and the item: "restricted function upon existence of restriction" is indicative of "all functions". Thereby, in a case where the item:" kind-code of the mobile terminal" is indicative of "A1" and the item: "application identification information" is indicative of "B4", utilizing all functions is restricted. Thus, the mobile terminal 100 is inhibited to utilize all the print functions of the image forming device 200.

Figure 4C:
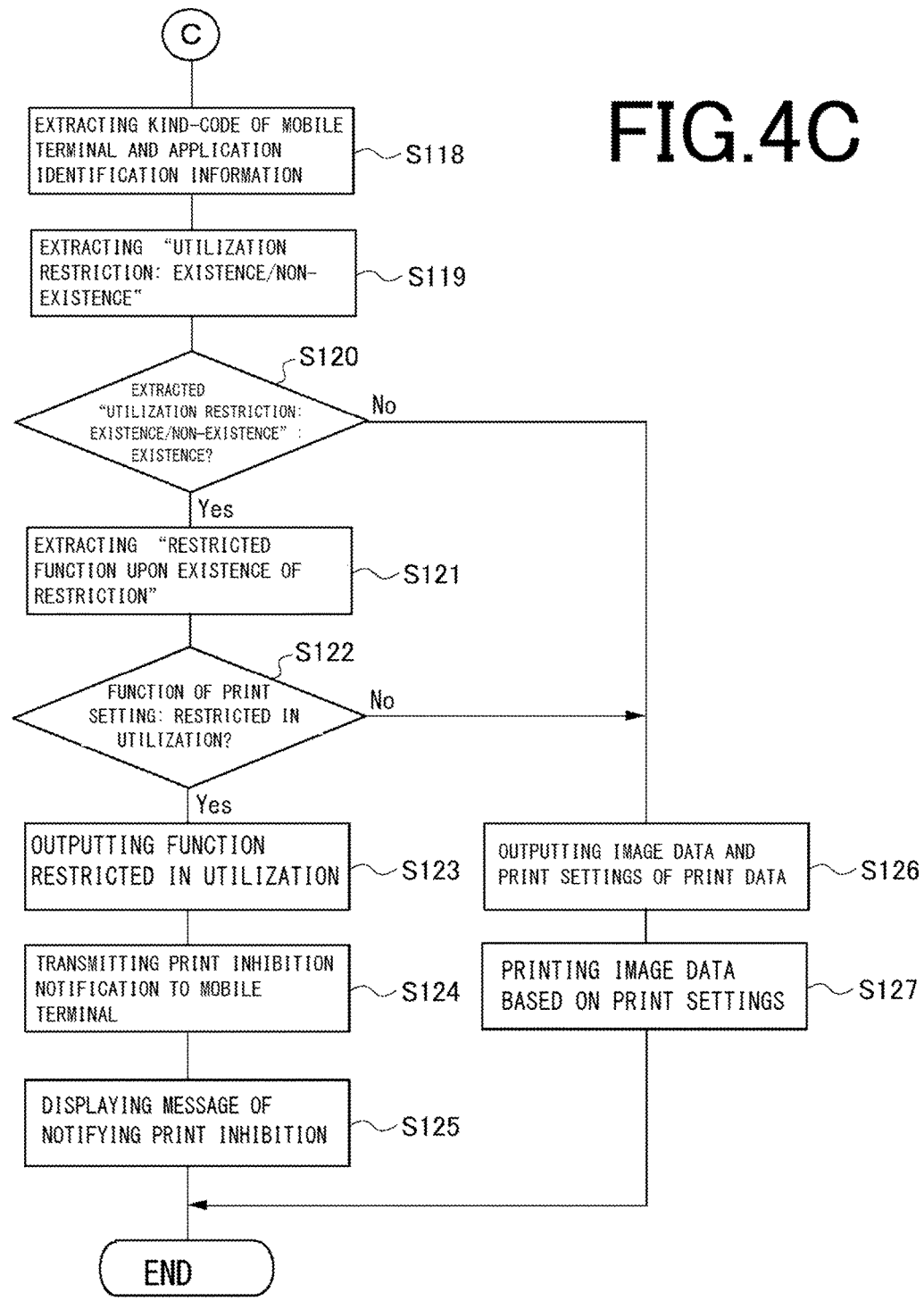
FIG. 4 is a flowchart that is indicative of a process routine of a print request from the mobile terminal to the image forming device.

Next, a description of process procedure is made as to how a print request that is issued from the mobile terminal 100 to the image forming device 200 is processed in a step-by-step manner with reference to flowchart shown in FIG. 4.

(Step S101)
First of all, the user starts the application for the printing from the operation panel 130 of the mobile terminal 100 and performs an operation for the print request that is made up of the name of the image and the print settings including size of print paper, double-sided print, page aggregation print, and monochrome or color printing.

(Step S102)
Then, when the name of image and the print settings are inputted from the operation panel process part 140, the application extracts image data whose identification name is in coincidence with the inputted name of image from the image data storage area 120*c*.

(Step S103)
Then, the application outputs the image data that is extracted in STEP S102 and the print settings that are set in STEP S101 to the print process part 110*a*.

(Step S104)
Then, the print process part 110*a* creates, when the image data and the print settings are inputted, print data that is made up of the image data and the print settings. It is to be noted that the print process part 110*a* extracts the kind-code of the mobile terminal 100 from the mobile terminal information data storage area 120*a* and the application identification information from the application information storage area 120*b* and add the extracted kind-code of the mobile terminal 100 and application identification information to the print data.

(Step S105)
Then, the print process part 110*a* transmits the created print data to the image forming device 200.

(Step S106)
Then, the print data receiving process part 210*a* of the image forming device 200, when receives the print data from the mobile terminal 100, stores the print data in the print data storage area 220*a*. Subsequently, the print data receiving process part 210*a* outputs the print data to the mobile terminal kind-code obtaining process part 210*b*.

(Step S107)
Then, the mobile terminal kind-code obtaining process part 210*b*, when being inputted with the print data, determines whether or not the print data is added with the kind-code of the mobile terminal 100. If the print data is determined to be added with the kind-code of the mobile terminal 100 (Yes in STEP S107), the control goes to STEP S108. Unless the print data is determined not to be added with the kind-code of the mobile terminal 100 (No in STEP S107), the control goes to STEP S109.

(Step S108)
In a case where the result of STEP S107 is Yes, the mobile terminal kind-code obtaining process part 210*b* extracts the kind-code of the mobile terminal 100 from the print data and stores the extracted kind-code in the terminal kind-code-basis application identification information storage area 220*b*. Subsequently, the mobile terminal kind-code obtaining process part 210*b* outputs the print data to the application identification information obtaining process part 210*c*.

(Step S109)
If the result of STEP S107 is No, the mobile terminal kind-code obtaining process part 210*b* requests the network communication part 240 for a MAC address. The network communication part 240 outputs, to the mobile terminal kind-code obtaining process part 210*b*, the MAC address of the mobile terminal 100 as the transmission source of the print data that is obtained using the Private MIB command.

(Step S110)
Then, the mobile terminal kind-code obtaining process part 210*b*, when being inputted with the MAC address, extracts the kind-code of the mobile terminal 100 from MAC address and stores the extracted kind-code in the terminal kind-code-basis application identification information storage area 220*b*. It is to be noted that the MAC address is made up of six IDs wherein the first three IDs are assigned for Vendor ID, the next ID is assigned for equipment ID, and the last two IDs are assigned for serial ID, which makes it possible to extract equipment ID that is kind-code of the mobile terminal 100 from the MAC address. For example, if the MAC address is represented by [a1: a2: a3: a4: a5: a6], "a4" indicates the kind-code of the mobile terminal 100. Subsequently, the mobile terminal kind-code obtaining process part 210*b* outputs the print data to the application identification information obtaining process part 210*c*.

(Step S111)
Subsequent to STEP S108 or STEP S110, the application identification information obtaining process part 210*c*, when being inputted with the print data, determines whether or not the print data is added with the application identification information. If the print data is determined to be added with the application identification information (Yes in STEP S111), the control goes to STEP S112. Unless the print data is determined not to be added with the application identification information (No in STEP S111), the control goes to STEP S113.

(Step S112)
If the result of STEP S111 is Yes, the application identification information obtaining process part 210*c* extracts the application identification information from the print data and then stores the extracted application identification information in the terminal kind-code-basis application identification information storage area 220*b*. Subsequently, the application identification information obtaining process part 210*c* outputs a print function utilization restriction request notice to the print function utilization restriction determination process part 210*f*.

(Step S113)
If the result of STEP S111 is No, the application identification information obtaining process part 210*c* outputs an application identification information request notice to the application identification information request transmitting process part 210*d*.

(Step S114)

Then, the application identification information request transmitting process part 210d transmits, when being inputted with the application identification information request notice, the application identification information request data to the mobile terminal 100.

(Step S155)

Then, the application identification information request receiving process part 110b of the mobile terminal 100, when receiving the application identification information request data, extracts the application identification information from the application information data storage area 120b and outputs the extracted application identification information to the application identification information transmitting process part 110c.

(Step S116)

Then, the application identification information transmitting process part 110c, when being inputted with the application identification information, transmits the inputted application identification information to the image forming device 200.

(Step S117)

Then, the application identification information receiving process part 210e of the image forming device 200, when receiving the application identification information, stores the application identification information in the terminal kind-code-basis application identification information storage part 220b and outputs the print function utilization restriction determination request notice to the print function utilization restriction determination process part 210f.

(Step S118)

Subsequent to STEP S112 or STEP S117, the print function utilization restriction determination process part 210f, when being inputted with the print function utilization restriction determination request notice, extracts the kind-code of the mobile terminal 100 and the application identification information from the terminal kind-code-basis application identification information storage part 220b.

(Step S119)

Then, the print function utilization restriction determination process part 210f extracts, from the print function utilization restriction setting table 220c, a "utilization restriction: existence or non-existence" that corresponds to the kind-code of the mobile terminal 100 and the application identification information.

(Step S120)

Then, the print function utilization restriction determination process part 210f determines whether or not the "utilization restriction: existence or non-existence" is "existence". If the "utilization restriction: existence or non-existence" is determined to be "existence" (Yes in STEP S120), the control goes to STEP S121. If the "utilization restriction: existence or non-existence" is determined to be "non-existence" (No in STEP S120), the control goes to STEP S126.

(Step S121)

If the result of STEP S120 is Yes, the print function utilization restriction determination process part 210f extracts, from the print function utilization restriction setting table 220c, a "restricted function upon existence of restriction" that corresponds to the "existence" of the "utilization restriction: existence or non-existence".

(Step S122)

Then, the print function utilization restriction determination process part 210f determines, immediately after extracting the print data from the print data storage area 220a, whether or not a function used for printing the image data of the print data based on the print settings of the print data (which is, hereinafter, referred to as "print setting function") exists in the "restricted function upon existence of restriction". Thereby, it is possible to determine whether or not the print setting function is restricted in utilization. If the print setting function is determined to be restricted in utilization (Yes in STEP S122), the control goes to STEP 123. Unless the print setting function is determined not to be restricted in utilization (No in STEP S122), the control goes to STEP 126. For example, in a case where color print is set in the print settings, determining whether or not "color print" exists in the "restricted function upon existence of restriction" makes it possible to determine whether or not utilizing color print in the print settings is restricted.

(Step S123)

If the result of STEP S122 is YES, the print function utilization restriction determination process part 210f outputs, to the print inhibition notice transmission process part 210g, the print setting function that is restricted in utilization.

(Step S124)

Then, the print inhibition notice transmission process part 210g, when being inputted with the print setting function, transmits a print inhibition notice data in which the print setting function is contained to the mobile terminal 100.

(Step S125)

Then, the print inhibition receiving process part 110d of the mobile terminal 110 extracts, when being inputted with the print inhibition notice data, the print setting function from the print inhibition notice data and causes the operation panel process part 140 to display, on the operation panel 130a message that notifies the print inhibition due to the restriction of utilizing the print setting function.

(Step S126)

If the result of STEP S120 is No or the result of STEP S122 is No, the print function utilization restriction determination process part 210f extracts the print data from the print data storage area 220a and outputs the image data of the print data and the print setting to the print part 290.

(Step S127)

Then, the print part 290 prints, when being inputted with the image data and the print settings, the image data onto a print sheet based on the print settings.

As will be appreciated from the above description, even if the mobile terminal 100 employs the printer driver that supports multiple device types of devices instead of installing the dedicated printer driver for the image forming device 200, the kind-code of the mobile terminal 100 and the application identification information make it possible to determine whether or not utilizing some or all of the print setting functions is restricted prior to a print execution. In addition, in a case where utilizing the print setting function is restricted, the message that notifies the restriction of utilization is displayed on the mobile terminal 100. For this reason, the user may take an action such as a re-print request by changing the print setting after confirmation of this message.

Further, though the present embodiment describes a case of the print request from the single mobile terminal 100 to the image forming device 200, similar print requests can be made from other plural mobile terminals that are allowable to connect to the network 400 or the Internet 600.

Moreover, though the present embodiment describes the utilization restriction when the print request is made from the mobile terminal 100 to the image forming device 200. But the present disclosure is not restricted thereto. For example, a utilization restriction determination part of an information processing device may be configured to determine, after a process data generation part of the mobile terminal 100 generates a process data for the process request, whether a function that is used to execute the process data (the function is hereinafter referred to as "process function") is restricted in utilization using the kind-code of the mobile terminal 100 and the application identification information and not to execute the process data in case of a utilization restriction. In brief, the information processing device is configured to accept the process request that is capable of determining whether or not the process request is acceptable.

In a typical technique, a print request is made to an image forming device from a mobile terminal in which a printer driver, such as Airprint, Google Cloud print or Mopria, is installed instead of a printer driver provided from the image forming device, the former printer driver (that is hereinafter referred to as "multi model printer driver") supporting multi-types image forming devices. If a print request using such a multi model printer driver is attempted to issue a print request to the image forming device, sometimes, the image forming device fail to perform the print function in a normal manner. For this reason, there is a problem that in addition to determining whether a print request is from an authorized user and mobile terminal, a determination has to be also made as to whether or not the application of the mobile terminal is allowable to utilize the image forming device.

However, the aforementioned information processing utilization management system and the information processing device, both according to the present disclosure, are capable of determining, in an easy way, whether or not the application of the mobile terminal can utilize the information processing unit.

In summary, though the present disclosure has been described in detail by way of the embodiment, the aforementioned embodiment is a mere example of the present disclosure and therefore the present disclosure is not restricted to this embodiment.

The information processing utilization management system and the information processing device, both according to the present disclosure, are applicable to a system or any apparatus that includes a device requesting a process and a device executing the process.

What is claimed is:

1. An image forming device management system, comprising:
    a mobile terminal; and
    an image forming device that is connected to the mobile terminal via a network, the image forming device accepting a print request from an application that is installed in the mobile terminal to execute a process,
    the mobile terminal including a print data generation part that generates print data based on the print request from the application and transmits the print data to the image forming device,
    the image forming device including
    a print data receiving part that receives the print data,
    a mobile terminal kind-code obtaining part that obtains a kind-code of the mobile terminal from the print data,
    an application identification information obtaining part that obtains identification information of the application from the print data, and
    a utilization restriction determination part that determines whether or not the print request from the application is acceptable based on both the kind-code of the mobile terminal and the identification information of the application, wherein the image forming device has a print function restriction setting table provided with items for a) one or more mobile terminal kind-codes, b) application identification information for a respective mobile terminal kind-code, c) a setting for utilization restriction: existence or non-existence for a respective combination of mobile terminal kind-code and application identification information, and d) a setting for a restricted-function-upon-existence-of-restriction for a respective combination of mobile terminal kind-code and application identification information, the application can be started by a user for printing from an operation panel of the mobile terminal, and can cause said transmission of the print data to include an image data, print settings, the kind-code of the mobile terminal and the identification information of the application, the image forming apparatus is configured to extract the kind-code of the mobile terminal and the identification information of the application from the print data received by the image forming device from the mobile terminal, extract, from the print function restriction setting table, a respective setting for utilization restriction: existence or non-existence corresponding to the extracted kind-code of the mobile terminal and the extracted identification information of the application, and extract, from the print function restriction setting table, a respective setting-for-a-restricted-function-upon-existence-of-restriction corresponding to the extracted kind-code of the mobile terminal, the extracted identification information of the application, and the extracted setting for utilization restriction: existence or non-existence when said extracted setting for utilization restriction: existence or non-existence is existence, the image forming device transmits a print inhibition notice data to the mobile terminal if processing of the image data is inhibited due to the application being restricted in utilization, wherein the print inhibition notice data includes the extracted setting for a restricted function, and the mobile terminal extracts, when receiving the print inhibition notice data, the setting for a restricted function from the print inhibition notice data and displays an indication of restriction of utilizing the setting for a restricted function on the operation panel thereof.

2. The image forming device management system according to claim 1, wherein the utilization restriction determination part makes a restriction on utilizing some or all functions of the image forming device.

3. The image forming device management system according to claim 1, wherein the image forming device includes a network communication part that is capable of obtaining a MAC address of the mobile terminal by transmitting and receiving data to and from, respectively, the mobile terminal, and the mobile terminal kind-code obtaining part, if the print data is not added with the kind-code of the mobile terminal, obtains the kind-code of the mobile terminal from the MAC address that is inputted from the network communication part.

4. The image forming device management system according to claim 1, wherein the mobile terminal includes an application identification information request receiving part that receives a request for identification information of the application of the mobile terminal from the image forming device and an application information request transmitting part that transmits the requested identification information of the application pursuant to a notice of the requested identification information of the application from the application identification information request receiving part, wherein the image forming device includes an application identification information request transmitting part that transmits, to the mobile terminal, the request for identification information of the application of the mobile terminal and an application identification information request receiving part that accepts the requested identification information of the application from the mobile terminal, and wherein the application identification information obtaining part, if the print data does not include the application identification information, causes the application identification information request transmitting part to send the request for identification information to the mobile terminal and causes the application identification information request receiving part to accept the requested identification information of the application.

5. A method performed on an image forming device management system, the method comprising:

accepting, by an image forming device that is connected to a mobile terminal via a network, a print request from an application that is installed in the mobile terminal to execute a process, generating, by a print data generation part included in the mobile terminal, print data based on the print request from the application and transmitting the print data to the image forming device, receiving, by a print data receiving part included in the image forming device, the print data, obtaining, via a mobile terminal kind-code obtaining part included in the image forming device, a kind-code of the mobile terminal from the print data, obtaining, via an application identification information obtaining part included in the image forming device, identification information of the application from the print data, and determining, via a utilization restriction determination part included in the image forming device, whether or not the print request from the application is acceptable based on both the kind-code of the mobile terminal and the identification information of the application, storing, by the image forming device, a print function restriction setting table provided with items for a) one or more mobile terminal kind-codes, b) application identification information for a respective mobile terminal kind-code, c) a setting for utilization restriction: existence or non-existence for a respective combination of mobile terminal kind-code and application identification information, and d) a setting for a restricted-function-upon-existence-of-restriction for a respective combination of mobile terminal kind-code and application identification information, and starting the application from an operation panel of the mobile terminal by a user, and transmitting the print data to the image forming device, wherein the print data has image data, print settings, the kind-code of the mobile terminal and the identification information of the application, extracting, via the image forming device, the kind-code of the mobile terminal and the identification information of the application from the print data received by the image forming device from the mobile terminal, extracting, via the image forming device, from the print function restriction setting table, a respective setting for utilization restriction: existence or non-existence corresponding to the extracted kind-code of the mobile terminal and the extracted identification information of the application, extracting, via the image forming device, from the print function restriction setting table, a respective setting-for-a-restricted-function-upon-existence-of-restriction corresponding to the extracted kind-code of the mobile terminal, the extracted identification information of the application, and the extracted setting for utilization restriction: existence or non-existence when said extracted setting for utilization restriction: existence or non-existence is existence, transmitting, from the image forming device to the mobile terminal, a print inhibition notice data to the mobile terminal if processing of the image data is inhibited due to the application being restricted in utilization, wherein the print inhibition notice data includes the extracted setting for a restricted function, and extracting in the mobile terminal when receiving the print inhibition notice data, the setting for a restricted function from the print inhibition notice data and displaying an indication of restriction of utilizing the setting for a restricted function on the operation panel thereof.

6. The method according to claim 5, wherein the print settings are selected from size of print paper, double-sided print, page aggregation print, and monochrome or color printing.

7. The image forming device management system according to claim 1, wherein the print settings are selected from size of print paper, double-sided print, page aggregation print, and monochrome or color printing.

* * * * *